United States Patent
McIntyre-Kirwin et al.

(10) Patent No.: US 11,501,480 B2
(45) Date of Patent: Nov. 15, 2022

(54) MULTI-MODAL MODEL FOR DYNAMICALLY RESPONSIVE VIRTUAL CHARACTERS

(71) Applicant: ARTIE, INC., Los Angeles, CA (US)

(72) Inventors: Armando McIntyre-Kirwin, Los Angeles, CA (US); Ryan Horrigan, Los Angeles, CA (US); Josh Eisenberg, Los Angeles, CA (US)

(73) Assignee: ARTIE, INC., Berkeley, CA (US)

( * ) Notice: Subject to any disclaimer, the term of this patent is extended or adjusted under 35 U.S.C. 154(b) by 0 days.

(21) Appl. No.: 17/596,262

(22) PCT Filed: Jun. 4, 2020

(86) PCT No.: PCT/US2020/036068
§ 371 (c)(1),
(2) Date: Dec. 6, 2021

(87) PCT Pub. No.: WO2020/247590
PCT Pub. Date: Dec. 10, 2020

(65) Prior Publication Data
US 2022/0148248 A1    May 12, 2022

Related U.S. Application Data

(60) Provisional application No. 62/858,234, filed on Jun. 6, 2019.

(51) Int. Cl.
| | | |
|---|---|---|
| *G06T 13/40* | (2011.01) | |
| *G06V 40/16* | (2022.01) | |
| *G06T 13/20* | (2011.01) | |
| *G06T 17/10* | (2006.01) | |
| *G10L 13/027* | (2013.01) | |
| *G10L 15/18* | (2013.01) | |

(52) U.S. Cl.
CPC ............ *G06T 13/40* (2013.01); *G06T 13/205* (2013.01); *G06T 17/10* (2013.01); *G06V 40/171* (2022.01);
(Continued)

(58) Field of Classification Search
CPC ....... G06T 13/40; G06T 13/205; G06T 17/10; G10L 13/027; G10L 15/1822
See application file for complete search history.

(56) References Cited

U.S. PATENT DOCUMENTS

| | | | |
|---|---|---|---|
| 6,570,555 B1 * | 5/2003 | Prevost | G06F 3/038 |
| | | | 345/156 |
| 2002/0135618 A1 * | 9/2002 | Maes | G06F 3/0481 |
| | | | 715/767 |

(Continued)

FOREIGN PATENT DOCUMENTS

WO    2017/137947 A1    8/2017

OTHER PUBLICATIONS

United States Patent and Trademark Office, International Search Report and Written Opinion dated Aug. 24, 2020 for PCT/US2020/036068, 8 pages.

(Continued)

*Primary Examiner* — King Y Poon
*Assistant Examiner* — Vincent Peren
(74) *Attorney, Agent, or Firm* — Perkins Coie LLP; Brian Coleman; Louis Yang

(57) ABSTRACT

The disclosed embodiments relate to a method for controlling a virtual character (or "avatar") using a multi-modal model. The multi-modal model may process various input information relating to a user and process the input information using multiple internal models. The multi-modal model may combine the internal models to make believable and emotionally engaging responses by the virtual character. The link to a virtual character may be embedded on a web browser and the avatar may be dynamically generated based on a selection to interact with the virtual character by a user. A report may be generated for a client, the report providing (Continued)

insights as to characteristics of users interacting with a virtual character associated with the client.

18 Claims, 10 Drawing Sheets

(52) U.S. Cl.
CPC ........ *G10L 13/027* (2013.01); *G10L 15/1822* (2013.01)

(56) References Cited

U.S. PATENT DOCUMENTS

| | | |
|---|---|---|
| 2007/0015121 A1* | 1/2007 | Johnson .................. G09B 7/02 434/156 |
| 2010/0082345 A1 | 4/2010 | Wang et al. |
| 2014/0212854 A1 | 7/2014 | Divakaran et al. |
| 2017/0039750 A1 | 2/2017 | Tong et al. |
| 2019/0035132 A1* | 1/2019 | Dirksen ................. G06T 17/20 |
| 2019/0156549 A1 | 5/2019 | Bouaziz et al. |
| 2019/0279410 A1* | 9/2019 | Orvalho .................. G06F 3/012 |
| 2020/0111262 A1* | 4/2020 | Rabinovich ........... G06F 3/0346 |
| 2021/0166461 A1* | 6/2021 | Riesen ..................... G06T 1/60 |

OTHER PUBLICATIONS

Zhang, H., et al., "Real-Time Adaptive Behaviors in Multimodal Human-Avatar Interactions," Nov. 8-12, 2010, Retrieved from: https://dl.acm.org/doi/pdf/10.1145/1891903.1891909, 8 pages.

\* cited by examiner

MULTI-MODAL MODEL FOR DYNAMICALLY RESPONSIVE VIRTUAL CHARACTERS

CROSS REFERENCE TO RELATED APPLICATION(S)

The present embodiments claim priority to U.S. Provisional Patent Application No. 62/858,234, titled "MULTI-MODAL MODEL FOR DYNAMICALLY RESPONSIVE AVATARS," and filed Jun. 6, 2019, the entirety of which is incorporated by reference in its entirety herein.

TECHNICAL FIELD

The disclosed teachings generally relate to control of virtual characters on a device. The disclosed teachings more particularly relate to controlling a dynamically responsive virtual character on the device using a multi-modal model.

BACKGROUND

Virtual characters (or "avatars") may facilitate interaction with a user on a user device (e.g., a smartphone, computer, augmented reality device). Virtual characters may include virtual representations of a character depicted in an environment shown on a display of the user device. Virtual characters do not need to have a visual form. They just need to be able to communicate with a user through the user device. An input from the user may be identified and inspected to determine an action for the virtual character to take. The virtual character may take the determined action (e.g., perform an animation, speech), facilitating continued interaction between the virtual character and the user.

An important consideration for generating a virtual character is the accuracy of the actions taken by the virtual character in response to input received by a user. Generally, a more accurate response to an input may increase the user experience in interacting with the virtual character. Conversely, if the virtual character misinterprets the input provided by the user, the virtual character may provide an inaccurate response to the input, lowering user experience with the virtual character.

Figure 1:
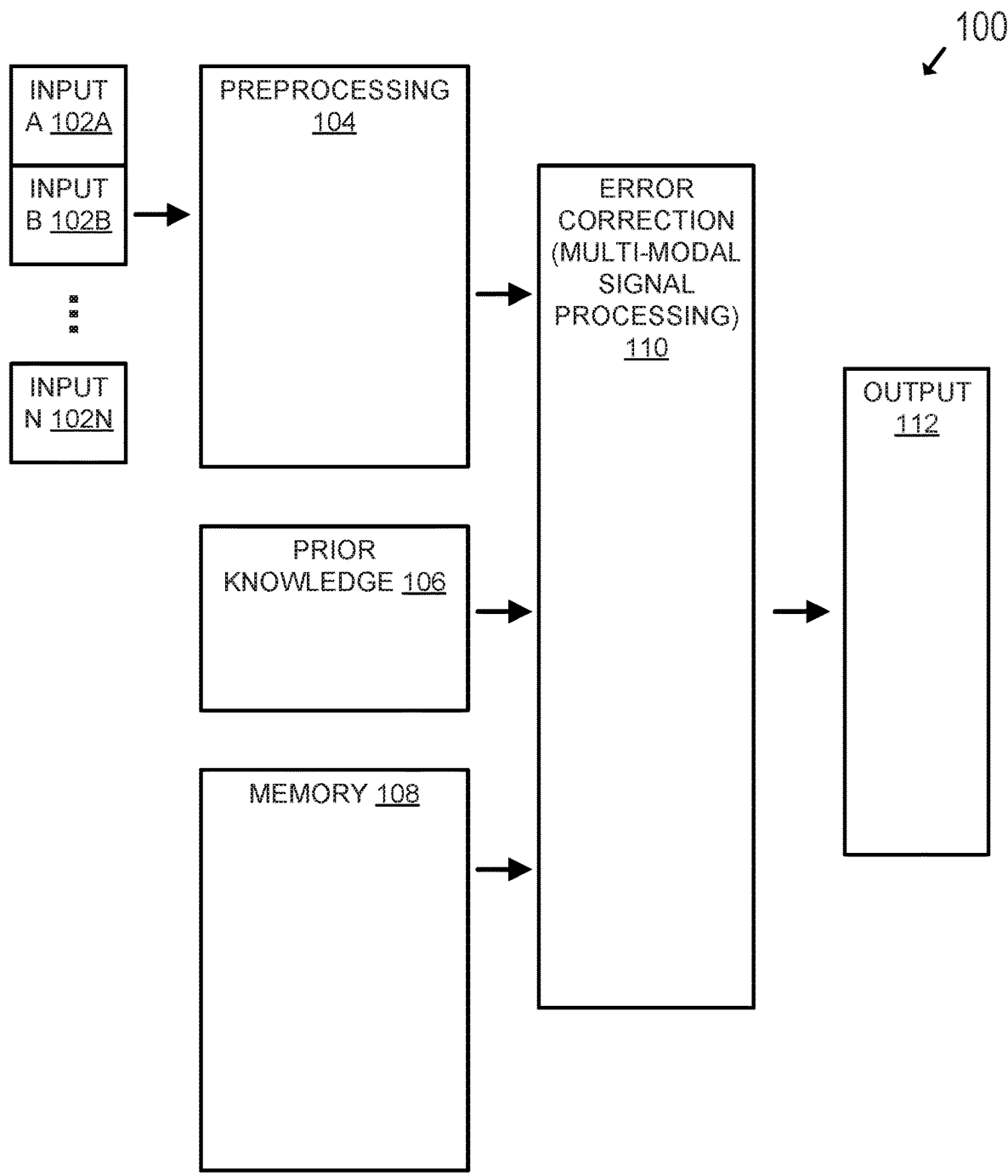
FIG. 1 illustrates a flow diagram of a multi-modal model for controlling an output for a virtual character, in accordance with various embodiments.

The drawings and tables depict various embodiments for illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

In the present disclosure, the term "avatar" can be interchanged with "virtual character." A virtual character can include a virtual entity on a user device that is capable of communicating with a user. This communication can occur through different types of interactions, such as by voice (conversation), text (e.g., a chat or messaging application), images/video, music, and/or the execution of any arbitrary program (e.g., a virtual character turning on a light switch in an internet of things embedded system that it has permission to adjust), etc. Virtual characters may appear to have an animated body, can just be a voice, or a text-based agent, for example, but having an animated body may not be necessary.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

System Overview

Virtual characters (or "avatars") may facilitate communication with a user via a user device. Virtual characters may be virtual representations of characters (e.g., characters from books, movies, television), representations of celebrities, representations of a human, representations of animals, representations of imaginary creatures, and representations of objects that are typically inanimate in the real world but for the purpose of the interaction can communicate with humans (like a talking book). Additionally, virtual characters can represent entities or animacies that have no physical form, like a ghost, spirit, or an emotion. For example, a user may interact with a virtual character representing a superhero over a smartphone associated with the user. From the perspective of the system generating the virtual character, the system may receive an input from a user and determine a response based on the input.

An important consideration for generating a virtual character is the accuracy of the actions taken by the virtual character in response to input received by a user. Generally, a more accurate response to an input may increase the user experience in interacting with the virtual character. Conversely, if the virtual character misinterprets the input provided by the user, the virtual character may provide an inaccurate response to the input, lowering user experience with the virtual character.

In many cases, the input provided to a virtual character is isolated and separately processed. For example, the virtual character may receive voice data and facial feature information of a user. However, the information may be isolated and separately processed in association with identifying an animation/speech to output for the virtual character, which may lower the accuracy of the virtual character's animations/speech.

Multi-Modal Model for Virtual Character Control and Error Correction

The present embodiments may at least partially relate to programs which automatically control a character's actions, and correct errors using a multi-modal model to provide accurate actions performed by the virtual character. A multi-modal model may include a model that identifies multiple modes of information (e.g., speech, facial expression, environmental information, information collected from prior interactions with the user, and information the system knows about the user) relating to a user and combines the information with various internal models to dynamically generate accurate animations/actions for the virtual character in response to user input.

The multi-modal model may perform error correction on information extracted from the data signals produced by an array of multi-modal sensors. In other words, an arbitrary array of multi-modal digital sensors collecting readings from the real-world environment and an arbitrary set of preprocessing and information extraction processes tailored for each type of data signal may use the extracted information from each sensor to correct errors in the information extracted from the other data signals. In addition to information collected by sensors in the time of the interaction, the multi-modal error correction can also use information collected about the user from the past. For instance, the multi-modal error correction (MMEC) can use transcripts of the things the user has said to the character in the past to fuel the error correction. Also, the MMEC can use information stored in a knowledge base (ontology) containing information about the user, to guide the error correction. Validated information about a user's past can be used to correct noisy signals being collected in the present. Information in the knowledge base can be things that were automatically extracted by the computer, or more structured information that was manually entered by humans.

FIG. 1 illustrates a flow diagram of a multi-modal model for controlling an output for a virtual character, in accordance with various embodiments. The multi-modal model may combine speech recognition techniques, natural language understanding, computer vision (e.g., facial expression recognition of a user, "world awareness" data about the user's physical environment and other physical objects), a knowledge base (ontology), a persona of a specified virtual character, and a social simulation into a unified multi-modal mode. The multi-modal model may be capable using the multiple internal models together to make a believable and emotionally engaging artificial intelligence algorithm that results in an accurate virtual character.

As shown in FIG. 1, the system may receive raw inputs (inputs 102A-N) from an array of sensors. The system may include preprocessing 104 that performs single mode signal processing. The system may include prior knowledge 106 that includes information about the world encoded into knowledge bases and models and memory 108 that stores information encoded about prior experiences with the user. The system may include multi-modal signal processing 110 that may perform error correction. The system may output an augmented result 112 based on the multi-modal signal processing.

In some embodiments, a computer system may include many different sensors, such as a microphone that produces an audio signal, a camera that produces a video stream signal, a thermo-resistor that can produce a temperature signal, an olfactory sensor that produces a signal of what smells are present, a GPS sensor, an accelerometer, etc. The system can receive signals from these sensors quantifying something happening in the real world and use the digital representations of these signals to correct the contents of each other.

The inputs received relating to a user may be combined with internal models included in the multi-modal model. As noted above, the models may include natural language understanding, a knowledge model, a persona, structural knowledge about a user's life/history and a social simulation, which together may increase the accuracy and user experience when interacting with the virtual character.

As an example, an input may include the voice of the user saying, "I am glad," where an internal model may utilize natural language understanding to identify the words "I am glad." In this example, a second input may include facial expression information identifying the expression of the user. An internal model may include facial-recognition techniques, such as computer vision, to determine the facial expression of the user. The system may check to determine whether the user is smiling, which may represent a confirmation that the user is actually glad. If the facial expression determines that the user is frowning or sad, the system may inspect all inputs to identify that the voice input of "glad" was incorrect and actually was "sad." As illustrated in this example, the multi-modal model can cross-reference and confirm the accuracy of various subsystems or internal models to increase the accuracy of the activity of the virtual character.

As another example, if the user is talking and providing a voice input to a virtual character representing a superhero, the system may receive a voice input from the user saying, "My favorite villain is the Choker." After identifying the words of the voice input, the system may utilize a knowledge model to inspect the word "Choker" and identify that it is close grammatically to the word "the Joker," a character known in the internal models as relevant to the superhero. The knowledge model may suggest that the user actually meant "the Joker," which may increase the accuracy of the output provided by the virtual character representing the superhero.

In some embodiments, the multi-modal model may receive voice data, facial expression data, and environmental information captured from sensors (e.g., camera, microphone) connected to a device. The voice data may be inspected and processed using automatic speech recognition (ASR) of the user's words (e.g., a linear stream of text comprised of what the user is saying). The facial expression information may be inspected and processed using a facial expression recognition algorithm (e.g., an algorithm that can recognize many common facial expressions). The environmental information may be inspected and processed by a world awareness computer vision algorithm that recognizes many objects (e.g., common objects, such as dogs, plants, coffee cups, other people, etc.). The world awareness algorithm may recognize other data points about the user's physical world (whether it is inside or outside, bright or dark, etc.).

In some embodiments, one or more computer vision algorithms may be active only if the user device is utilizing an augmented reality output on a device (e.g., a smartphone) with multiple cameras. In some cases, the user device may not be outputting an augmented reality display and only have access to one camera or no camera.

One internal model may include a natural language understanding (NLU) model that is capable of identifying a subject, point of view (POV), events, intent, nouns, verbs, etc. from the ASR data based on voice input information. In other words, when the internal model receives words from the user that are recognized via ASR, the internal model may add additional layers of insights and context relating to the voice data of the user.

As an example, the user may say, "I was at school all day and I learned how to play the guitar. It was super fun." The internal model may extract that the user is talking in the first person, that they are the subject, and that their intent was to learn the guitar. The multi-modal model may inspect the internal model and generate a response, such as "I am glad you are having fun learning the guitar!" This may be more accurate than just using ASR techniques alone, where the system would understand the word "guitar," but wouldn't determine how it was being used in relation to anything else and how the speaker felt about it or what their goals are. Accordingly, the system would be unable to respond positively or negatively to the voice input of the user.

In some embodiments, the internal models may include a knowledge model that represents the virtual character's world. For example, if a client is a movie studio to generate virtual characters of their characters, the knowledge model may have information relating to that character to best portray the character. This information may include a 'persona' representing the particular aspects of a character's personality. The knowledge model may include a social simulation that interprets the dynamics of other users and virtual characters. In some embodiments, the knowledge model may automatically generate more information relating to a character by receiving information for that character from various sources (e.g., scripts, comic books, books, user input, etc.).

The system may receive raw data (e.g., streaming speech data, real-time speech-to-text), capture facial expression recognition data, and capture world-awareness data about the user's physical environment and physical objects. The system may compare the raw data with each other while also running internal models, NLU algorithms, knowledge model, persona, and social simulation to derive additional context and meaning from the users. Based on this information and models, the multi-modal model may generate an output for the virtual character with greater accuracy.

When computers use sensors to get information about the world, the data transduced by the sensors may contain errors with respect to the reality that they attempted to depict. Sensors may sample the information generated by real world events. In addition to this loss of information, computational methods for interpreting data streams produced by sensors may also be error prone. There may be two primary places for errors in this paradigm; in sensor to data signals transformation, and in interpreting the data stream. Multi-modal error correction can assist to reduce some of the errors introduced when the sensor output is converted into data signals. Additionally, if data signals have higher accuracy, it may be easier to interpret them, since they more accurately represent reality. This may be how multi-modal error correction can help improve accuracy on multiple fronts.

Figure 2:
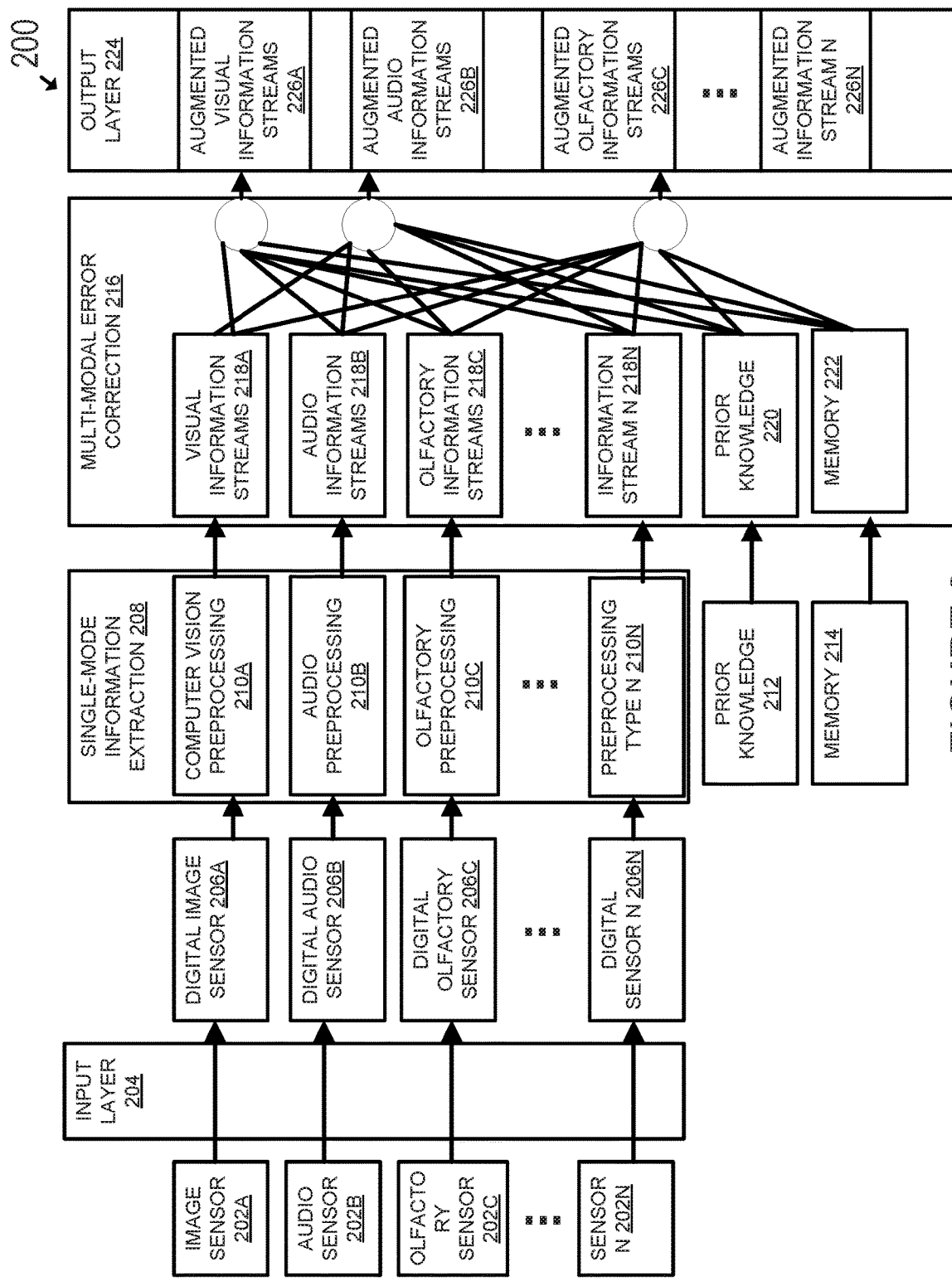
FIG. 2 illustrates a flow diagram to correct errors of a virtual character using a multi-modal, in accordance with various embodiments.

FIG. 2 illustrates a flow diagram 200 to correct errors of a virtual character using a multi-modal, in accordance with various embodiments. As shown in FIG. 2, multiple sensors (e.g., image sensor 202A, audio sensor 202B, olfactory sensor 202C, sensor N 202N) may provide data at an input layer 204. The data from the input layer 204 may include a digital image signal 206A, digital audio signal 206B, digital olfactory feature signal 206C, digital signal N 206N, etc. This input data may be processed using single mode information extraction 208, which may include computer vision preprocessing 210A, audio preprocessing 210B, olfactory preprocessing 210C, preprocessing type N 210N, etc. A multi-modal error correction 216 may receive the processed information and detect errors in the information streams. For example, visual information streams 218A, audio information streams 218B, olfactory information streams 218C, information stream N 218N, prior knowledge 220, and memory may be processed by multi-modal error correction 216 to derive augmented streams (e.g., 226A-N) in the output layer 224.

Each device may use a unique version of multi-modal error correction when interacting with other devices. Information may be merged from all senses, along with common-sense and world knowledge, to decipher what is actually happening in the real-world. Computers may be instructed how to synthesize information of different modes, and prior information of the world (encoded into knowledge bases and models). Each of the connections in the multi-modal error correction stage may represent using data signals from different origins to improve the final data stream.

Some examples of how information from different sensors can be used to improve the quality of the data streams may include using audio-based ASR with computer vision-based lip read to improve ASR results, using olfactory sensor to correct ASR or image recognition, using image/object recognition to correct ASR, using ASR to correct image recognition, using knowledge of the world (be it a real or fictional world) to improve ASR, CV, etc.

In some embodiments, the reason why virtual characters are not specifically mentioned may be that this error correction process can be used in different types of systems. The system may be used to give a virtual character awareness of what is said, of what sounds are being made, about the physical world, and about a user's physical reactions to the character, but it can be used by other types of computer systems, such as a self-driving car or a smart-home.

In some embodiments, the purpose of the multi-modal error correction phase may be to detect false negatives and to reclassify their values. This may improve the recall of information extraction pipelines.

As shown in FIG. 2, world knowledge assets may be integrated. In FIG. 2, world knowledge may include an input to the multi-modal error correction phase of the pipeline. World knowledge may be represented separately from the signals extracted by the sensors in the input layer. The information extracted by the input layer's sensors may capture information about events happening in the world at a present time. Examples of world information includes what the user is saying, what objects can be detected in the camera frame, etc.

In some embodiments, some world knowledge assets may be collected beforehand. The world knowledge assets may include facts about a world, be it factual information about the real world, or fictional information about a story world (like the world of a fictional character). Common sense knowledge can be included in the world knowledge assets, like the object 'mug' is a type of 'cup,' which can be used for events semantically related to eating and drinking. Additionally, information about the cannon of a fictional character can also be codified as world knowledge assets. Such as, for the world of Batman®, "the Joker®" is a villain who plays psychological games on the hero "Batman." Other villains in the world of Batman may include "Poison Ivy" and "Sub-Zero." This information can be encoded into structured knowledge bases or ontologies.

World knowledge/assets may be separate from the sensor data streams, because it represents information gathered in the past, while the signals from the sensors in the input layer may represent data signals that are continuously acquired while the interaction with the computer system is active. The world knowledge base may be static or does not grow during an interaction/user session. The knowledge bases may be curated and populated beforehand, so that the computer can efficiently use this codified information to either make better decisions, or in some contexts, to aid the multi-modal error correction process.

This information can enhance the multi-modal error correction process. As an example, information may include a user talking to a computer system about the world of Batman (in Gotham City). The user says something, and then the ASR system thinks the user said, "The choker is a bad dude." In the world of Batman, "the Joker" is a villain, and it is much more probable that the user meant to say that "The Joker is a bad dude." The system may be used in smart homes, cars, or any other device that interacts with a user.

Figure 3:
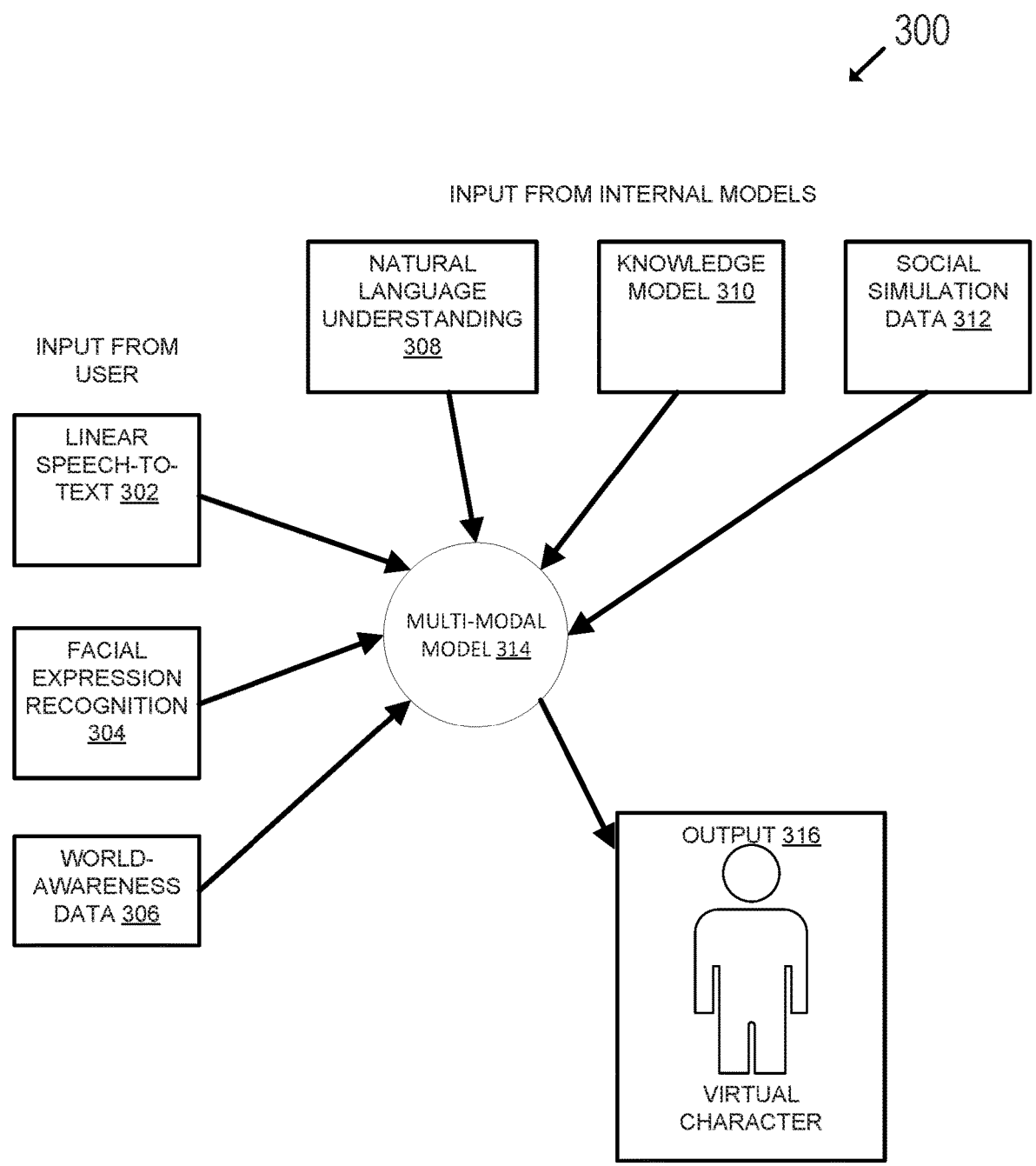
FIG. 3 illustrates a flow diagram of a multi-modal model for controlling a virtual character, in accordance with various embodiments.

FIG. 3 illustrates a flow diagram 300 of a multi-modal model for controlling a virtual character, in accordance with various embodiments. The system may include receiving inputs from a user and implementing internal models for a multi-modal model.

The internal models implementing the features of the virtual character may allow for the virtual character to act and respond in real-time or near real-time. Instead of isolating and separately processing various inputs (voice input from the user, facial expression recognition of a user), the present embodiments may input and inspect multiple inputs to understand and generate more accurate animations/speech/outputs represented in actions by the virtual character. Examples of inputs received may include information relating to the voice of the user 302, facial expressions of the user 304, and the environment of the user 306 (e.g., by scanning the background of the video feed and see if the computer vision algorithm can recognize common objects like pets, televisions, furniture, etc.).

The inputs can also include internal model inputs, such as natural language understanding 308 data, knowledge model data 310, social simulation data 312, etc. The multi-modal model 314 can process inputs 302-310 to generate an output 316 representing action(s) taken by a virtual character. The present embodiments may receive multiple inputs and compare the inputs against one another to generate accurate outputs for the virtual character.

Figure 4:
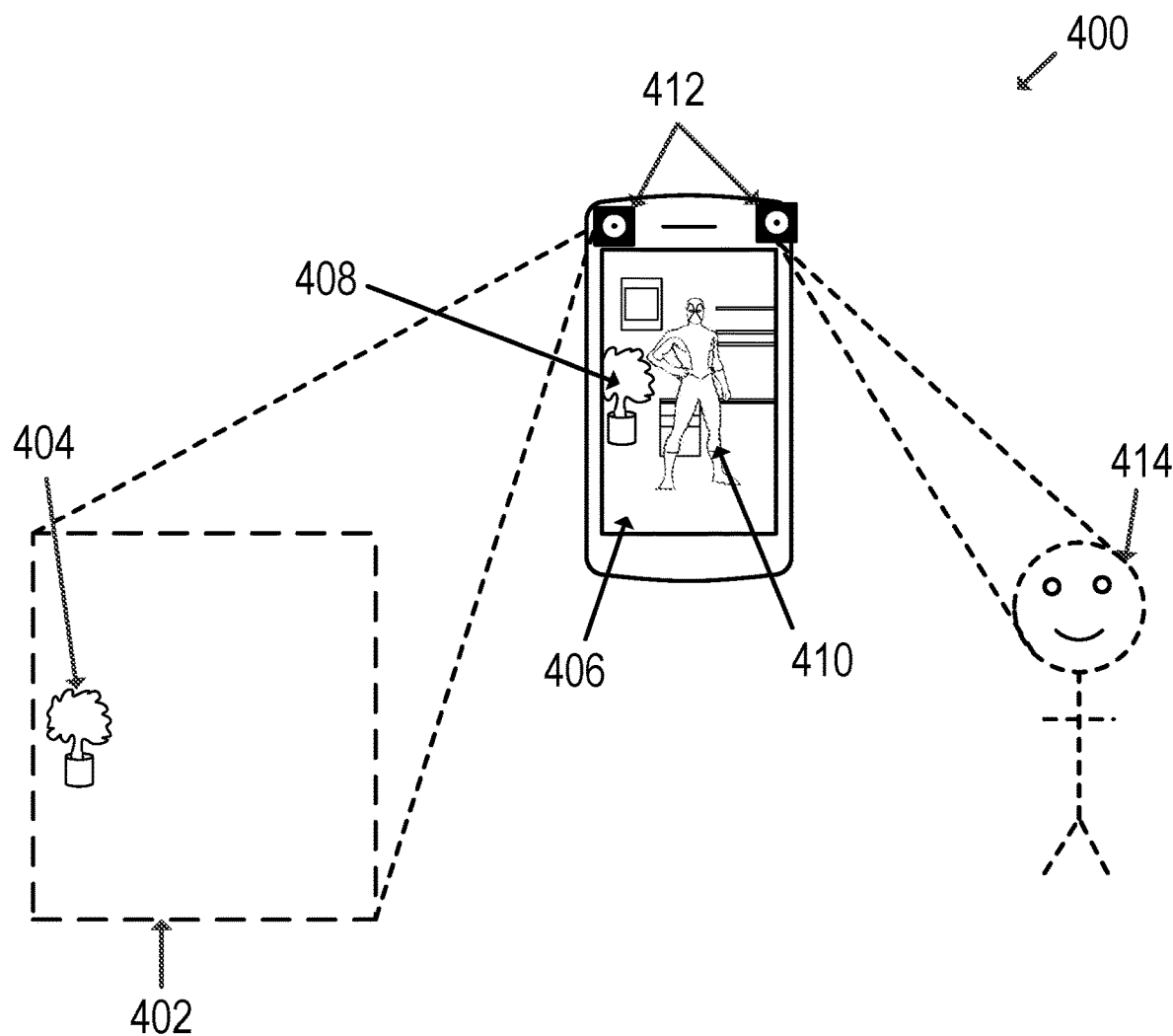
FIG. 4 illustrates a system to interact with a virtual character implemented on a multi-modal model, in accordance with various embodiments.

FIG. 4 illustrates a system 400 to interact with a virtual character implemented on a multi-modal model, in accordance with various embodiments. As shown in FIG. 4, the user may provide input information (e.g., speech, facial recognition, environmental information, etc.) from one or more sensors (e.g., camera, microphone, etc.) on a user device (e.g., smartphone, augmented reality glasses, computer, gaming console, etc.). The multi-modal model may execute on one of the user devices or on an external device connected to the user device via a network such as the internet. The multi-modal model may inspect the input information, execute the internal models, and output a display illustrating the virtual character in the display captured by the sensor. For example, as illustrated in FIG. 4, a virtual character is displayed in a location within the environment captured by the sensors.

As an example, the user device can capture an environment 402 that includes objects (e.g., object 404). The displayed environment 406 and identified object 408 can be provided on an interface with a virtual character 410. The sensors 412 can capture the environment surrounding the user device. For example, the sensors 412 can capture information relating to a user 414.

The multi-modal model may generate an output for the virtual character that includes both animations and speech. The possible animations may be stored in a library of potential animations for a character. This may be associated with a similar library of pre-recorded audio files that correspond to each animation. The libraries may be built for each character and provide a foundation to create separate libraries for other characters.

In some embodiments, the system may include a universal rigging module that is common across all of the virtual characters. Rigging is a technique in 3D animation that essentially creates the bones, muscles, and skin of a 3D character, for example. We can use a universal rigging module across one or more virtual characters in a network.

The system may generate a procedural animation that is driven by AI. In other words, if the AI wants to say, "I love the guitar too," the AI may instruct the virtual character to smile and it should happen procedural without ever having to have had a static animation file for that particular character smiling.

In some embodiments, the multi-modal model may generate voices without having to pre-record many audio files. The multi-modal model can receive a relatively low amount of time (e.g., 5 to 15 hours) of a character's voice and create a text-to-speech/speech synthesis system that will generate the correct sounding voice for anything the AI is trying to say.

The present embodiments may be executed on a device that is configured to output an augmented reality display, but the present embodiments may be executed on any suitable display, such as a touchscreen, monitor, screen, etc. In some embodiments, the present system may utilize both front-facing and rear-facing cameras on a user device, particularly if the system utilizes both a FER and the world-awareness internal model at the same time.

In some embodiments, controlling a virtual character displayed on a device may include receiving input information from a sensor (e.g., camera, microphone) disposed on the device (e.g., smartphone, computer, AR-capable device). Controlling the virtual character may include implementing at least two internal models (e.g., the multi-modal model) configured to identify characteristics of the input information combine the characteristics identified by the internal models to identify a similarity between the characteristics identified by the internal models. Finding a similarity between the characteristics may identify if a characteristic identified from a first source of input information (e.g., the user saying "I am happy") does not match a characteristic identified from a first source of input information (e.g., a facial expression of the user that is frowning or sad). In the event that the characteristics have a similarity below a threshold, the internal models may identify a characteristic that is more likely to be accurate based on inspecting a knowledge model that includes information common to the virtual character.

Controlling a virtual character may include inspecting a library of potential actions associated with the virtual character to determine an action that matches the characteristics identified by the internal models. Controlling a virtual character may include outputting the action to have the virtual character perform the action that matches the characteristics identified by the internal models.

In some embodiments, controlling a virtual character may include determining that the similarity of a first characteristic identified by the internal models falls below a threshold similarity. Controlling a virtual character may include inspecting a third internal model representing a listing of entries representing information commonly associated with the virtual character. Controlling a virtual character may include matching the first characteristic with an entry listed in the listing associated with the virtual character, wherein the characteristics identified by the internal models includes the entry listed in the listing.

In some embodiments, the input information includes audio information represented speech of a user, facial expression information representing a facial expression of the user, and environmental information representing an environment captured by the sensor of the device.

In some embodiments, the internal models include a natural language understanding model configured to derive context and meaning from audio information, a knowledge model configured to identify information specific to the virtual character, and a social simulation model configured to identify data relating to the user and other virtual characters.

In some embodiments, controlling a virtual character may include displaying the virtual character on the display of the device and instructing the virtual character to perform an initial action representing a query to the user, wherein the input information represents a response by the user to the query.

In some embodiments, the information acquired through the sensors may cause the information in the knowledge base (ontology) to need to be revised. For example, if the user says "My favorite pizza topping is anchovy," and the current version of the knowledge base says that the user's favorite pizza topic is mushroom, then the knowledge base may now be wrong and needs to be updated to reflect the new preference for anchovy. Accordingly, new information acquired by sensors can be used to correct errors or update information in the knowledge base.

In some embodiments, the virtual character can have access to information about a user's past. This can include a timeline of events in their life. For example, a virtual character might know that the user owned a bakery 5 years ago. This information can be leveraged in many ways. If the character knows the user is a baker, there may be a whole set of vocabulary or jargon for bakers, for instance the word "knead." The word "knead" sounds like the word "need," and may often times be transcribed wrong in automatic speech recognition. Many systems can transcribe the word "knead" incorrectly as "need." If the virtual characters knows the user is a baker, then the system can understand that there is a much more likely probability that the user will say the word "knead" and more accurately transcribe it. If the character knows that the user was a baker, it can more accurately transcribe their speech, by knowing the types of words they will use, based on their profession.

Fully-Interactive Virtual Character Executing on a Web Browser

In many cases, a user downloads the information necessary to render a virtual character on the user device in order to generate the virtual character. To have a user download the virtual character information, a client may convince the user to download an application associated with the augmented reality virtual character. Performing the steps of explicitly downloading a specific application on a user device may introduce friction for the user, which may result in the user not implementing the virtual character.

The present embodiments may relate to a dynamically rendered virtual character (or Instant virtual character) that renders and generates a 3D virtual character that utilizes the multi-modal model as described herein. The virtual character may include the 3D visual "body" that resembles a character. The instant virtual character may be embedded in a hyperlink. The instant virtual characters may be shared on various networks, such as social media networks. For example, a company may be an entertainment company that may share a virtual character of a popular character or celebrity with a set of fans. The company may share a hyperlink or other identifier (e.g., a link to a YouTube® video), text message, etc. When shared over a network (e.g., social media) the instant virtual character may execute instantly in a social media feed or via a web browser without a user needing to download an application in order to view it.

An instant virtual character may run on a web browser. This may enable interactions with virtual characters to smartphones associated with users. The multi-modal model may seamlessly migrate the user into a web-based augmented reality via mobile web browser (e.g., Safari®, Chrome®) with a short load time (e.g., 1 second). Accordingly, a user may select a link on a webpage (e.g., Twitter®) that says, "click this link and a celebrity will appear in your house." By clicking the link, the virtual character may appear on the screen in near real-time (e.g., less than 1 second).

The system may create a highly-optimized 3D file with a suitable 3D file format (e.g., GL Transmission Format (GLTF)). The animations and audio files for a virtual character may be streamed to the user device in batches so that earlier batches that are needed to execute the virtual character are first sent to the user device and prioritized. The batches may be discarded after execution to make more room for other batches of information. The batches sent to the user may be modified and dynamic based on the input from the user and the responses generated by the virtual character.

In some embodiments, the system may include web-based tracking of the environment of the user (e.g., the floor) so that the instant virtual character is located in an appropriate position on the display.

In some embodiments, the system performs speech recognition, natural language understanding, facial expression recognition, and world-awareness algorithm in the user's mobile web browser in real-time or near real-time.

In some embodiments, the system uses computer vision algorithms to identify objects in the foreground. For example, the system may determine that the virtual character is standing behind a couch, where the algorithms modify the virtual character to be properly occluded by the couch and thus looks like he is standing behind it.

In some embodiments, the system supports multi-user sessions so that two or more people can see a virtual character or virtual character in the same place via separate user devices (e.g., smartphones). A computer vision algorithm may track the environment of a user and synchronize it will multiple devices in real-time even though those devices will have slightly different world views.

In some embodiments, the system supports synchronized viewing of an Instant Virtual character from different places. For example, if the multi-modal model generates a virtual character (e.g., a celebrity musician) for a celebrity, and she wants to play a song for a large group of people at the same time, the system could generate a large group of celebrity virtual characters all playing music at or near the same time.

In some embodiments, the system may support users creating their own Instant Virtual characters by taking images of themselves or another target that can be converted into 3D models.

In some embodiments, dynamically generating a virtual character using a multi-modal model includes embedding a link to a webpage linking a web browser to an application to generate the virtual character. Dynamically generating the virtual character may include receiving a selection from a device that the link has been selected. This may indicate that a user interacting with the device wishes to have the virtual character displayed on a display of the device. Dynamically generating the virtual character may include transmitting a stream of data from the application representing information to generate the virtual character and displaying the virtual character on the display of the device.

Dynamically generating the virtual character may include receiving input information from a sensor disposed on the device and implementing at least two internal models included in the multi-modal model. The internal models may be configured to identify characteristics of the input information and combine the characteristics identified by the internal models to identify a similarity between the characteristics identified by the internal models. Dynamically generating the virtual character may include inspecting a library of potential actions associated with the virtual character to determine an action that matches the characteristics identified by the internal models and outputting the action that matches characteristics identified by the internal models representing instruction to have the virtual character perform the action.

In some embodiments, dynamically generating the virtual character includes initiating a first action for the virtual character, wherein the first action representing a query to the user that includes speech and an animation performed by the virtual character, wherein the input information represents a response by the user to the query.

In some embodiments, dynamically generating the virtual character includes sharing the embedded link to a plurality of users via a network, receiving a selection from a set of devices indicating that the link has been selected, and transmitting the stream of data from the application representing information to generate the virtual character to each device included in the set of devices.

In some embodiments, dynamically generating the virtual character includes transmitting a first batch of the stream of data at a first time, the first batch including information to initially generate the virtual character and transmitting a second batch of the stream of data at a second time after the first time, the second batch including information to output a first action by the virtual character, wherein the first batch is discarded at the second time.

In some embodiments, dynamically generating the virtual character includes inspecting environmental information to identify a floor included in the environment and positioning the virtual character at a first position directly above the floor identified in the environment.

Extracting Insights from a Multi-Modal Interaction with a Virtual Character

A client (e.g., a corporation) may generate a virtual character using at least some of the embodiments as described herein. The client may have many people (e.g., one million people) interacting with the virtual character during a specified time period. As an example, an entertainment company may generate a virtual character of a celebrity for many people simultaneously.

The present embodiments may at least partially relate to extracting insights from a user's interactions with a virtual character. Insights may be extracted automatically on data gathered by any set of sensors during an interaction with a virtual character.

Figure 5:
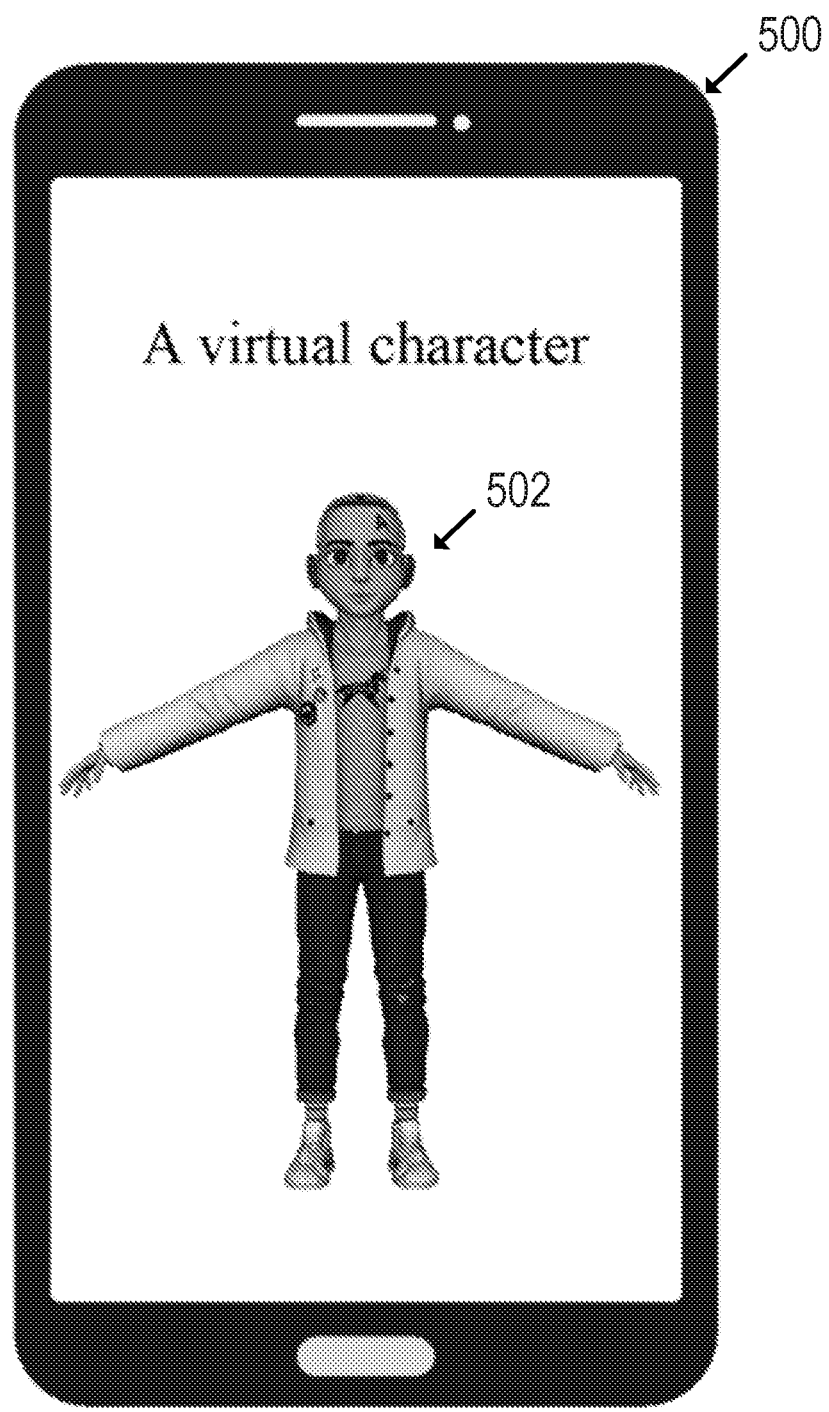
FIG. 5 illustrates an example virtual character displayed on a device, in accordance with various embodiments.

FIG. 5 illustrates an example virtual character 502 displayed on a device 500, in accordance with various embodiments. A virtual character may include a virtual representation of an animate entity, such as a representation of a real human, a fictional human, or an imaginary character, like a space alien, or a talking dog. The virtual character can be seen on a computer screen, most typically, for the context of this patent, on a smart phone. The virtual character may have a representation of a body that is animated on the screen. A virtual character does not need to appear visually, it could just present itself as a voice. It could also just communicate via texts (chat), or images.

The virtual character can talk to a human user by speaking through the speakers on the smart phone. The audio of the computer speaking may be synthesized by a text to speech synthesizer. A virtual character may affect the real world through the act of speaking, but virtual characters can affect the world in other ways, like turning lights on and off, turning music on, and controlling the motion of a robot through a room.

A key feature of virtual characters is that they may include animacy. Animacy may include the ability of a character to carry out actions that affect the real world. A virtual character's ability to decide how to react to something in the real world (or even a virtual world) is what makes them animate.

Figure 6:
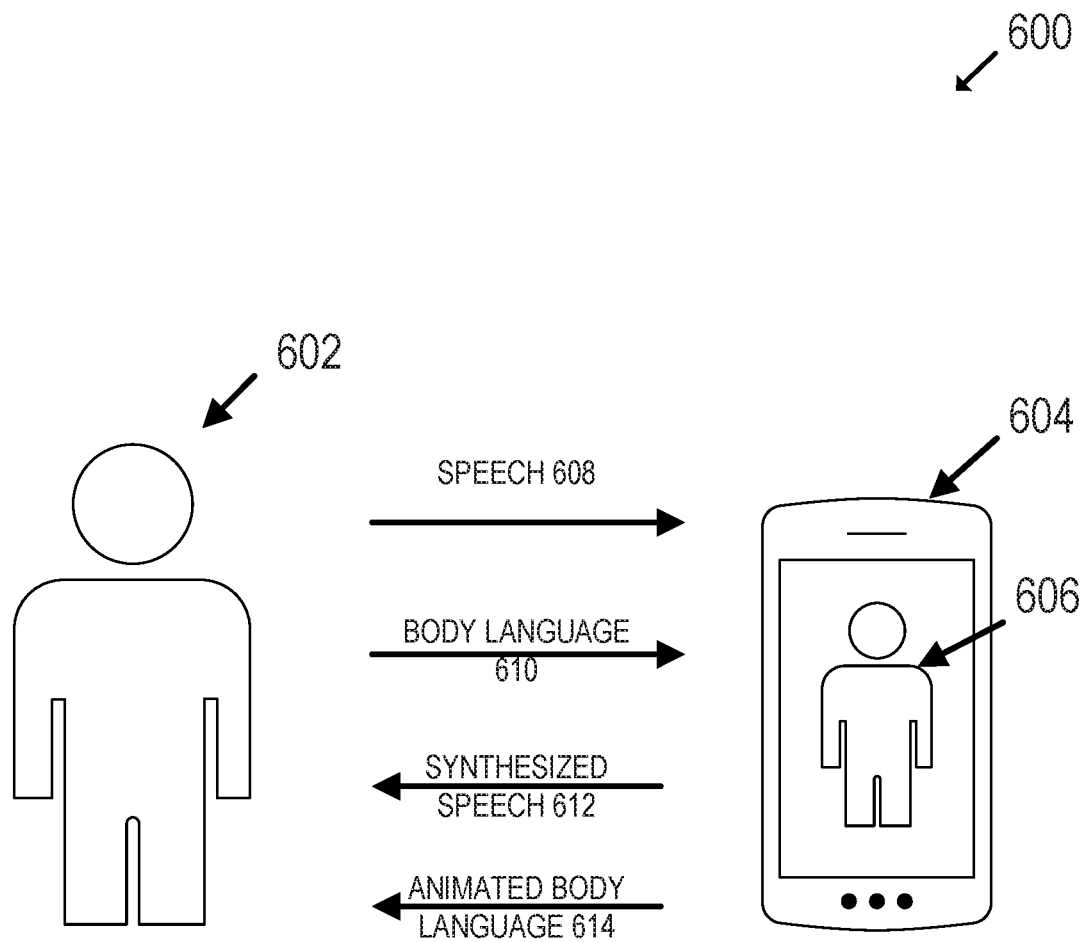
FIG. 6 illustrates a flow diagram of interactions between a user and a user device displaying a virtual character, in accordance with various embodiments.

FIG. 6 illustrates a flow diagram 600 of interactions between a user and a user device displaying a virtual character, in accordance with various embodiments. An interaction with a virtual character may include when a person 602 and a virtual character 606 via device 604 communicate with each other. People, and virtual characters, can actuate communication in many forms, such as via speech 608 and/or body language 610. An interaction with a virtual character may include when a person actively engages with the virtual character. A virtual character might not be animate in the same way that a person or an animal is animate, but the virtual character may simulate animacy, and the virtual characters may respond in a semantically coherent and even interesting way. The virtual character can provide any of synthesized speech 612 and/or animated body language 614.

Some interactions may be in the form of a conversation. The virtual character can use the microphones of the cellphone to listen to what the human user is saying to the virtual character. The microphone may turn the sound waves into an audio file, which can be converted to text, by speech to text models, and then this text can be interpreted by natural language understanding models. Once the virtual character understands what the human user has said, it can begin to decide how to respond back to the human user, be it through synthesizing speech, animating its body in a physical gestural response, or a combination of both types of reactions.

The virtual character can also communicate by moving in virtual space. The virtual space may include any representation of three-dimensional space that can be visualized on a computer screen, such as a cell phone representing augmented or virtual reality or a headset that can representing either augmented or virtual reality. Some examples of a virtual character moving in a virtual space may include while it's talking, its lips become animated, to signal that it is using its virtual lips to talk, changing its body language to express different feelings or emotions, changing its facial expression to signal different emotions, altering the positioning of its body parts to express different feelings (crossed arms for defensiveness, hands on hips for showing dominance, etc.), etc.

An insight may include a piece of structured information or understanding extracted from raw data, which may be coupled with some kind of statistic measuring how certain we are that this bit of understanding is correct. As an example, to test whether the joke is funny, the system may send an instant virtual character to a large number of people (100 or 1000). The virtual character tells the joke to each user (or test subject). Then, the instant virtual character records the reaction of the user after the joke was delivered. the system can analyze the reaction of the user to determine if the joke was funny or not. A user can express this is many different ways, like through laughing, which can be automatically classified by a computer by using computer vision to find laughing on the user's face and by analyzing the audio of user to find the sounds of laughter. If there is no laughter, or if a user has a negative reaction, this can also be picked up automatically by a computer, and this can imply that the user did not think that the joke was funny. Due to the scale of the experiment, which is sending this joke test to a large number of people, the system can gather statistics about how funny the joke was. The results of this experiment are an insight; knowing whether the joke was funny (which is some structured piece of understanding) and knowing statistically how funny it is (which measure how sure we are of our structured piece of understanding).

Figure 7:
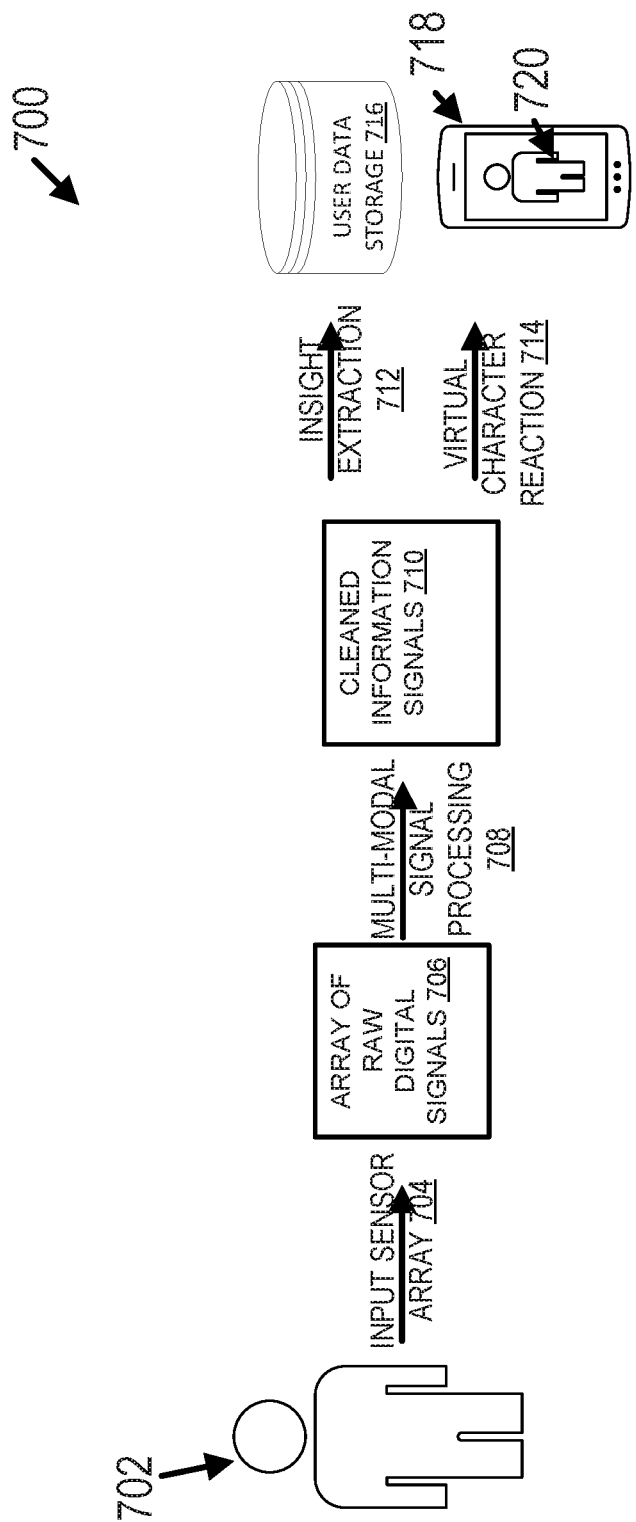
FIG. 7 illustrates a flow diagram of extracting insights from virtual character reactions, in accordance with various embodiments.

FIG. 7 illustrates a flow diagram 700 of extracting insights from virtual character reactions, in accordance with various embodiments. Many types of information can be collected when a human user interacts with a virtual character. The human will typically speak to the virtual character. The human can also communicate how they feel through their body language how they feel. The text of what people say and the physical reactions or body language that people use may be two types of human communication that we will focus on, the present embodiments can apply to any other type of communication that can be picked up by a sensor and converted into a data signal for interpretation by a computer.

The same process for turning stimuli from the real world into digital representations of this data for the virtual character to make decisions based on may be used for extracting insights on that data. The system may extract insights from the same data that the virtual character has access to when deciding how to react to the human user. Essentially, the human user may have a reaction (be it by speaking, or by making a physical gesture), this real-world stimulus is picked up by the input sensor array and turned into a raw digital signal. Signal processing may be performed on this signal (in either one mode or multiple modes). This may result in a cleaned information signal. This signal may be used for at least two things, first, it may be saved in long term storage so that insights can be extracted from this data at a later time, and second, the information signal may be sent to the decision-making facilities of the virtual character, so that the character can decide how to react to the real-world stimuli.

Extracting insights, in this context, may be akin to transforming real-world events into structured understanding for the virtual character to make decision based on. The data processing pipelines for getting a clean information signal may be the same for multiple use cases. Once the information about a user's reactions during an interaction with a virtual has been saved, insights can be extracted about the interaction. An insight here may be some understanding or higher-level information extracted from an unrefined set of data.

The present embodiments relate to the ability to extract insights from interactions with virtual characters. This may be different than extracting insights from text streams, as interactions with virtual characters have more structure and they produce multi-modal data signals (speech, visual data streams, olfactory data streams, etc.).

For example, a device can capture an input sensor array 704 indicative of stimuli provided by user 702. The array of raw digital signals 706 can be processed using multi-modal digital signal processing 708. The cleaned (or processed) information signals 710 can be processed via any of insight extraction 712 and stored in user data storage 716 and/or processed with decision-making logic to derive a virtual character reaction 714 to output reactions by a virtual character 720 on a user device 718.

Figure 8:
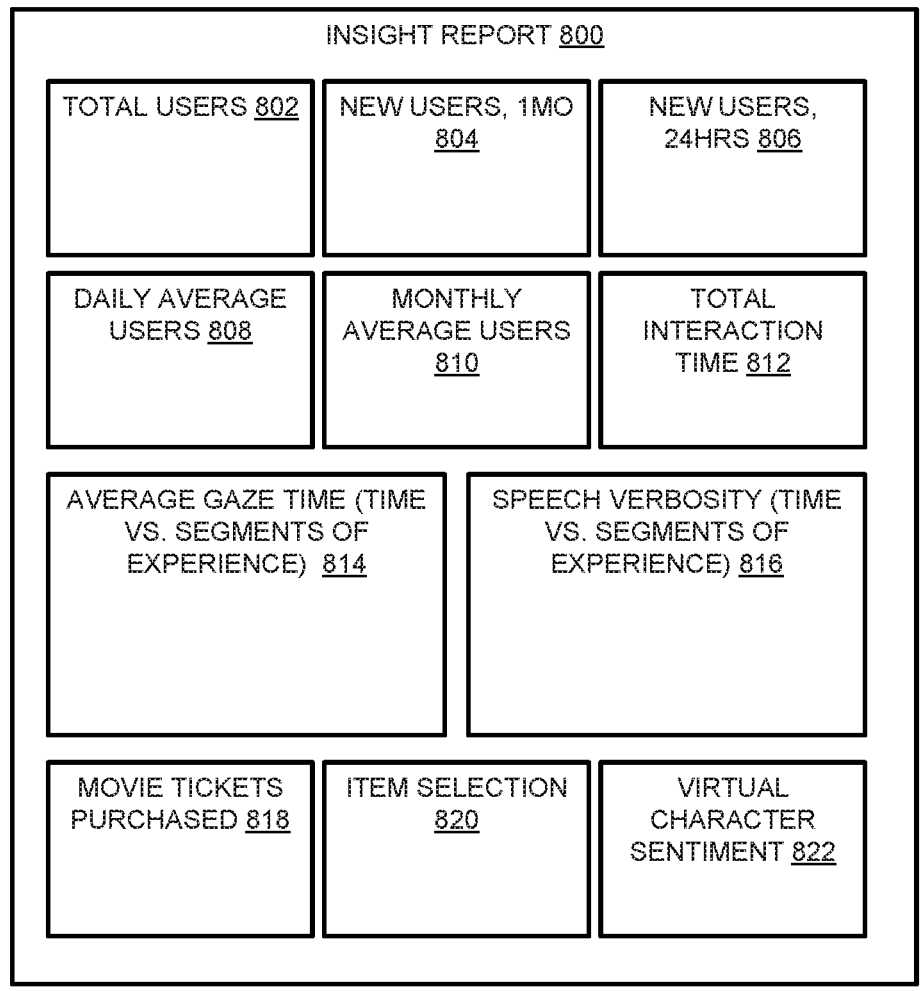
FIG. 8 illustrates an insights dashboard, in accordance with various embodiments.

FIG. 8 illustrates an insight dashboard 800, in accordance with various embodiments. As shown in FIG. 8, the client may view a dashboard or insights portal to view many insights into their audience representing users interacting with the virtual characters. Due to the receipt of various information relating to users, the system can identify various features of a user. For example, the system can identify a facial expression of a user or a tone of a user representing a reaction to what action the virtual character takes. The information received also includes the environment around the user.

The insights dashboard may display a report of information, such as a number of users, a number of new users, a number of daily average users, and total interaction time. The insights dashboard may also include graphical representations of insight information, such as active gaze time, speech verbosity, purchase information, item selection information, and sentiment information.

In some embodiments, the virtual character can facilitate various transactions between a client and a user over a user device. For example, a virtual character can identify that the user would like to purchase an item, and the virtual character may forward the user to a specific webpage or facilitate the transaction directly.

The insights can run a sentiment analysis and other algorithms on user data from interacting with a virtual character. For example, a character may virtually receive a message from another character and ask the user how they feel about the characters teaming up to do a movie together. The insights can identify the aggregate response rate (e.g., the insights show the company that 78% of their audience thinks this is a good idea).

In some embodiments, a method may include generating a virtual character on each of a group of devices associated with users interacting with the virtual character. The method may include receiving input information relating to users interacting with the group of devices. The method may include implementing at least two internal models on each device. The internal models may be configured to identify characteristics of the input information and combine the characteristics identified by the internal models to identify a similarity between the characteristics identified by the internal models. For the characteristics associated with each device in the group of devices, the method may include inspecting a library of potential actions associated with the virtual character to determine an action that matches the characteristics identified by the internal models. For each device in the group of devices, the method may include outputting the action that matches characteristics identified by the internal models representing instruction to have the virtual character perform the action.

The method may include obtaining information relating to interactions between the virtual character and the users associated with the group of devices. The method may include generating a report representing features of the interactions between the virtual character and the users based on the obtained information relating to the interactions.

In some embodiments, report includes a number of users interacting with the virtual character, a number of daily average users, and an average interaction time by the users.

In some embodiments, the method includes generating a graphical representation of at least one of an active gaze time, a speech verbosity, item selection information, and sentiment information associated with the users interacting with the virtual character, wherein the virtual representation is included in the report.

For instance, as shown in FIG. 8, the insight report can include any of a total user indicator 802, a new user indicator for the last month 804, a new user indicator for the past 24 hours 806, a daily average users indicator 808, a monthly average users indicator 810, a total interaction time indicator 812, an average gaze time graph indicative of time vs. segments of experience 814, a speech verbosity graph indicative of the time vs. segments of experience 816, a subsequent action taken by user in response to interacting with the virtual character (e.g., movie tickets purchased 818, item selection 820), virtual character sentiment 822, etc.

The Virtual Character Layer

The present embodiments may allow for virtual characters to be implemented in many applications. For example, a virtual character could help a customer in a store find a product or could help a hardware store customer pick out new paint or could replace a touchscreen-based automated teller machine with something with a more personalized, friendly face. In some embodiments, the location of virtual characters in the real-world may be displayed in a mapping application.

In some embodiment, the insights may include an improvement system that feeds data back into machine learning data sets and automatically improves the results. For example, what if virtual character asked a million people to take a selfie. The system could use all of those photos to make new algorithms for detecting user's faces from selfie camera photos.

Figure 9:
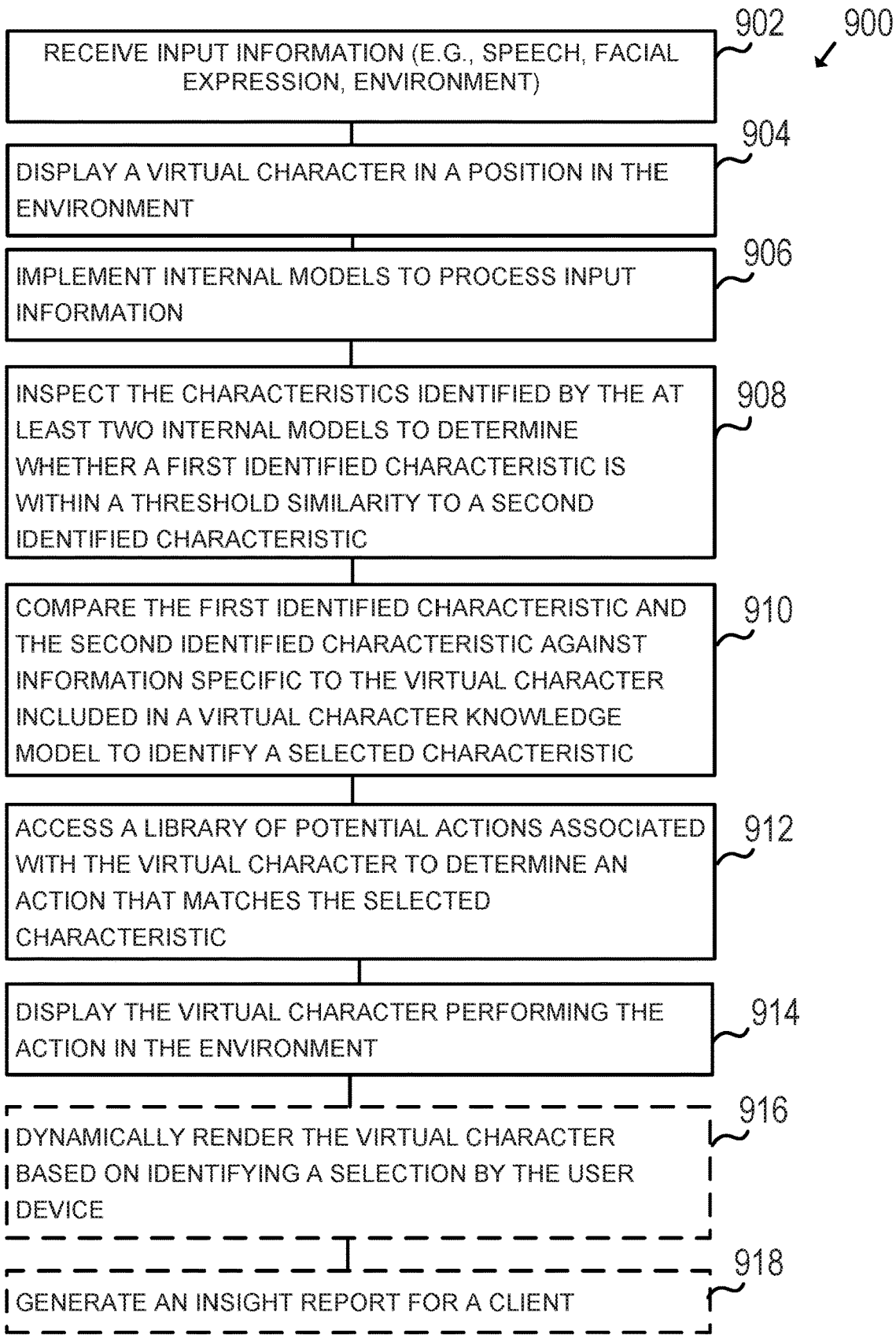
FIG. 9 illustrates a block diagram of a method to control a virtual character using a multi-modal model, in accordance with various embodiments.

FIG. 9 illustrates a block diagram of a method to control a virtual character using a multi-modal model, in accordance with various embodiments. The method may include receiving input information, such as speech information, facial expression information, environmental information, etc. (block 902). The information received may be multi-modal (e.g., audio, visual).

The method may include displaying a virtual character in a position in the environment (block 904). The virtual character may be overlaid or added into a real-world environment, such as an environment captured by sensors/cameras. In some embodiments, the virtual character may output a first action upon being displayed in the environment. The first action may include a query to the user, for example.

The method may include implementing internal models to process the input information (block 906). The internal models may process input information to determine various information about the user, such as words the user spoke, a facial expression of the user, etc.

The method may include inspecting the characteristics identified by the at least two internal models to determine whether a first identified characteristic is within a threshold similarity to a second identified characteristic (block 908). Identifying a similarity between the characteristics may include referencing an internal model to determine a characteristic that matches a characteristic commonly associated with the virtual character.

As an example, a first identified characteristic can include identifying that a word spoken by the user is "I am sad." A second identified characteristic can include identifying a facial expression showing the user is smiling or happy. Therefore, comparing these characteristics may result in determining that the characteristics are not within a threshold similarity. As noted below, a knowledge model can be used to identify which contrasting characteristic is more likely accurate. For example, the knowledge model may identify that the previous action by a virtual character most likely solicits a positive reaction from a user. In this example, the characteristic showing that the user is smiling may be more accurate and the first characteristic is incorrect, as the user may have said "I am glad" instead of "I am sad."

The method may include comparing the first identified characteristic and the second identified characteristic against information specific to the virtual character included in a virtual character knowledge model to identify a selected characteristic (block 910). The knowledge model can include information specific to a virtual character, such as common responses by users, terms relating to the virtual character, other characters often related to the virtual character, etc.

The method may include accessing a library of potential actions by the virtual character (block 912). The library may include a database, registry, listing, etc. that includes information representing potential animations/speech by a particular virtual character. Potential actions can also be created at runtime by using generative models.

The method may include determining an action to be performed by the virtual character based on the processed input information. The multi-modal model may process various information relating to a user and combine the various information to determine an action with greater accuracy. Determining an action can include identifying an action in the library that most closely matches an accurate action identified from the processed input information.

The method may include displaying the virtual character performing the action in the environment (block 914). In some embodiments, the method may include dynamically generating the virtual character based on identifying a selection by the user device (block 916). Dynamically generating may include controlling a virtual character with a short delay (e.g., less than 1 second). The selection by the user device can include a click on a hyperlink by a user interacting with the user device.

The method may include generating an insight report for a client (block 918). The insight report can include various information about users interacting with a virtual character generated on a user device.

In a first exemplary embodiment, a method for controlling a virtual character is disclosed. The method can include receiving multi-modal input information from a device, the multi-modal input information including any of speech information, facial expression information, and environmental information representing an environment surrounding the device. The method can also include displaying the virtual character in a position in a display environment presented on the device. The method can also include implementing at least two internal models to identify characteristics of the multi-modal input information.

The method can also include inspecting the identified characteristics of the at least two internal models to determine whether a first identified characteristic of the identified characteristics includes a threshold number of similar features of a second identified characteristic of the identified characteristics. The method can also include comparing the first identified characteristic and the second identified characteristic against information specific to the virtual character included in a virtual character knowledge model to select a selected characteristic based on determining that the first identified characteristic includes the threshold number of similar features of the second identified characteristic of the identified characteristics.

The method can also include accessing a library of potential actions associated with the virtual character to determine an action that matches the selected characteristic, the action including both an animation to be performed by the virtual character and associated audio. The method can also include implementing the determined action by modifying the virtual character in the environment presented on the device and outputting the associated audio.

In some embodiments, the at least two internal models includes a speech recognition model capable of parsing a speech sentiment from the speech information and a facial feature recognition model capable of detecting a facial feature sentiment based on the facial expression information, wherein the selected characteristic is a sentiment common among the speech sentiment and the facial feature sentiment, and wherein the determined action is determined based on the sentiment.

In some embodiments, the at least two internal models include a prior knowledge model capable of retrieving prior knowledge information comprising information relating to previous engagement with a user, wherein the selected characteristic is selected based on the prior knowledge information processed using the prior knowledge model.

In some embodiments, the internal models include a natural language understanding model configured to derive context and meaning from audio information, an awareness model configured to identify environmental information, and a social simulation model configured to identify data relating to a user and other virtual characters.

In some embodiments, the method can include instructing the virtual character to perform an initial action representing a query to a user on the device, wherein the input information represents a response by the user to the query.

In some embodiments, the method can include sharing an embedded link to a plurality of users via a network. The method can also include receiving a selection from any of a set of devices indicating that the embedded link has been selected. The method can also include, responsive to receiving the selection, transmitting a stream of data to the device of the set of devices that sent the selection to display the virtual character on the device.

In some embodiments, the method can include transmitting a first batch of the stream of data at a first time, the first batch including information to initially generate the virtual character on the display of the device. The method can also include transmitting a second batch of the stream of data at a second time after the first time, the second batch including information to output a first action by the virtual character, wherein the first batch is discarded at the second time.

In some embodiments, the method can include inspecting environmental information to identify a portion of the environment representative of a floor of the environment. The method can also include positioning the virtual character at a first position above the portion of the environment representative of the floor of the environment.

In a second exemplary embodiment, a device configured to provide a response to a multi-modal input relating to a user captured by the device is provided. The device can include at least one memory. The at least one memory can include at least two internal models configured to identify characteristics from multi-modal input information. The at least one memory can also include a virtual character knowledge model including information specific to a virtual character. The at least one memory can also include a library of potential actions associated with the virtual character, each action is associated with an animation to be performed by the virtual character and associated audio.

The device can also include at least one processor. The at least one process can be configured to receive multi-modal input information including at least one of speech information, facial expression information, and environmental information representing an environment. The at least one process can also be configured to inspect the characteristics identified by the at least two internal models to determine whether a first identified characteristic is within a threshold similarity to a second identified characteristic. The at least one process can also be configured to compare the first identified characteristic and the second identified characteristic against the virtual character knowledge model to identify a selected characteristic.

The at least one process can also be configured to determine an action that matches the selected characteristic by inspecting the library of potential actions associated with the virtual character, the action including audio to be outputted on the device. The at least one process can also be configured to output the audio on the device.

In some embodiments, the at least one processor is further configured to display the virtual character on the display of the device in a position in the environment derived from the environmental information. The at least one process can also be configured to implement the action that includes both the audio to be outputted on the device and a selected animation to be performed by the virtual character by modifying the virtual character in the environment presented on the device.

In some embodiments, the at least two internal models include a prior knowledge model capable of retrieving prior knowledge information comprising information relating to previous engagement with the user, wherein the selected characteristic is selected based on the prior knowledge information processed using the prior knowledge model.

In some embodiments, the at least two internal models includes a speech recognition model capable of parsing a speech sentiment from the speech information and a facial feature recognition model capable of detecting a facial feature sentiment based on the facial expression information, wherein the selected characteristic is a sentiment common among the speech sentiment and the facial feature sentiment, and wherein the determined action is determined based on the sentiment.

In a third exemplary embodiment, a computer-implemented method to dynamically generate a virtual character on a web browser of a user device is provided. The computer-implemented method can include embedding a link to the web browser of the user device, the link linking the web browser to an application executing on the user device. The computer-implemented method can also include receiving an indication from the user device that the link has been selected. The computer-implemented method can also include transmitting a stream of data from the application representing information to the web browser to generate the virtual character.

The computer-implemented method can also include displaying the virtual character on the web browser of the user device. The computer-implemented method can also include receiving multi-modal input information from the user device, the multi-modal input information including speech information, facial expression information, and environmental information representing an environment. The computer-implemented method can also include implementing at least two internal models to identify characteristics of the multi-modal input information.

The computer-implemented method can also include inspecting the characteristics identified by the at least two internal models to determine whether a first identified characteristic is within a threshold similarity to a second identified characteristic. The computer-implemented method can also include comparing the first identified characteristic and the second identified characteristic against information specific to the virtual character included in a virtual character knowledge model to select a selected characteristic based on determining that the first identified characteristic includes the threshold number of similar features of the second identified characteristic of the identified characteristics.

The computer-implemented method can also include accessing a library of potential actions associated with the virtual character to select an action that matches the selected characteristic, the action including an animation to be performed by the virtual character and associated audio. The computer-implemented method can also include displaying the virtual character in the environment performing the action and outputting the associated audio.

In some embodiments, the web browser includes a page displayed on a mobile application executing on the user device.

In some embodiments, the computer-implemented method can include storing information relating to the selected characteristic and the action. The computer-implemented method can also include aggregating a series of selected characteristics and actions for a plurality of users. The computer-implemented method can also include processing the series of selected characteristics and actions for the plurality of users to derive a set of analytics relating to engagement with the virtual character with the plurality of users. The computer-implemented method can also include presenting an analytics dashboard to display the set of analytics relating to engagement with the virtual character with the plurality of users.

Example Processing System

Figure 10:
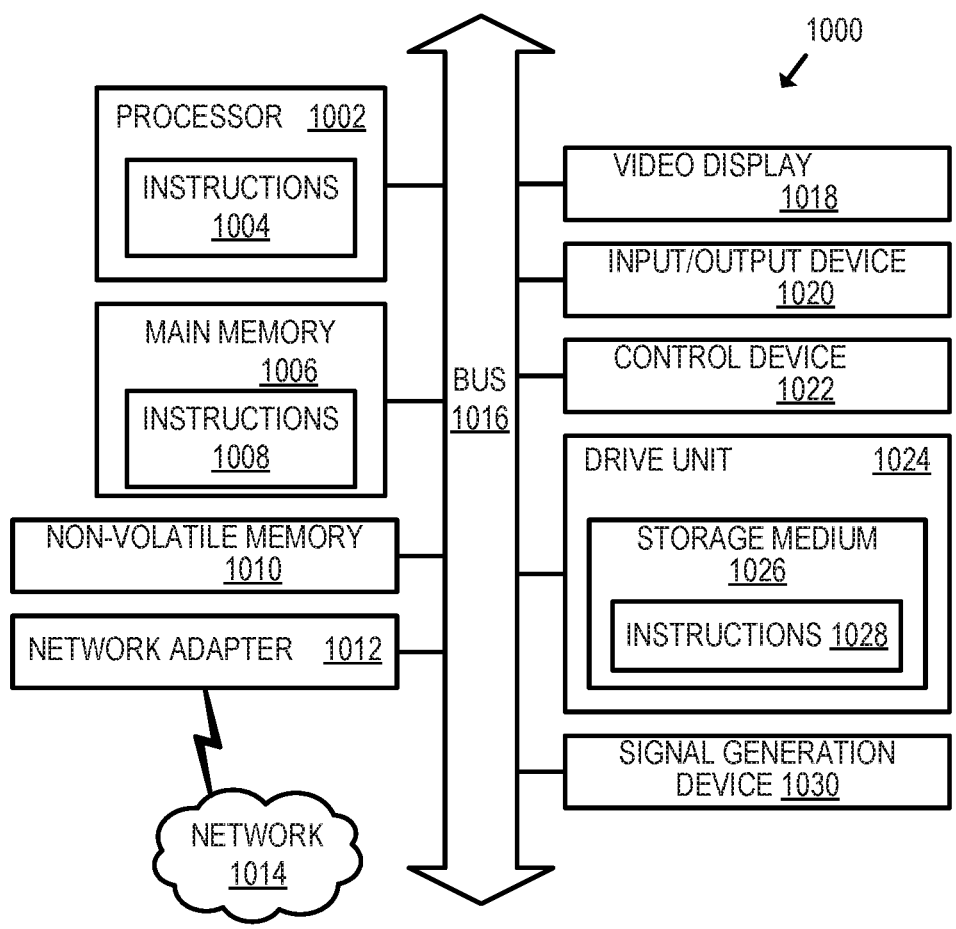
FIG. 10 is a block diagram illustrating an example of a processing system in which at least some operations described herein can be implemented.

FIG. 10 is a block diagram illustrating an example of a processing system in which at least some operations described herein can be implemented. For example, some components of the processing system 1000 can be hosted on an electronic device as described in the present embodiments.

The processing system 1000 can include one or more central processing units ("processors") 1002, main memory 1006, non-volatile memory 1010, network adapter 1012 (e.g., network interface), video display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1594 bus (i.e., "Firewire").

The processing system 1000 can share a similar computer processor architecture as that of a desktop computer, tablet computer, personal digital assistant (PDA), smartphone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the processing system 1000.

In general, the routines executed to implement the embodiments of the disclosure can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in a computing device. When read and executed by the one or more processors 1002, the instruction(s) cause the processing system 1000 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The techniques disclosed herein can include a tool or system to extract information from a design drawing to supplement the capabilities of a product manufacturing process. The present embodiments can assist in the generation/modification of a quote/estimate, the generation of manufacture feedback, the manufacturing scheduling/ordering process, etc.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A computer-implemented method to dynamically generate a virtual character on a web browser of a user device, the computer-implemented method comprising:
    embedding a link in the web browser of the user device, the link linking the web browser to an application executing on the user device;
    receiving an indication from the user device that the link has been selected;
    transmitting, from the application to the web browser, a stream of data representing information to generate the virtual character;
    displaying the virtual character on the web browser of the user device;
    receiving multi-modal input information from the user device, the multi-modal input information including speech information, facial expression information, and environmental information representing an environment;
    implementing at least two internal models to identify characteristics of the multi-modal input information;
    inspecting the characteristics identified by the at least two internal models to determine whether a first identified characteristic is within a threshold similarity to a second identified characteristic;
    comparing the first identified characteristic and the second identified characteristic against information specific to the virtual character included in a virtual character knowledge model to select a selected characteristic based on determining that the first identified characteristic is within the threshold similarity to the second identified characteristic;
    accessing a library of potential actions associated with the virtual character to select an action that matches the selected characteristic, the action including an animation to be performed by the virtual character and associated audio; displaying the virtual character in the environment performing the action and outputting the associated audio; storing information relating to the selected characteristic and the action;
    aggregating a series of selected characteristics and actions for a plurality of users;
    processing the series of selected characteristics and actions for the plurality of users to derive a set of analytics relating to engagement with the virtual character with the plurality of users; and
    presenting an analytics dashboard to display the set of analytics relating to engagement with the virtual character with the plurality of users.

2. The computer-implemented method of claim 1, wherein the web browser includes a page displayed on a mobile application executing on the user device.

3. The computer-implemented method of claim 1, wherein the at least two internal models includes a speech recognition model capable of parsing a speech sentiment from the speech information and a facial feature recognition model capable of detecting a facial feature sentiment based on the facial expression information, wherein the selected characteristic is a sentiment common among the speech sentiment and the facial feature sentiment, and wherein the determined action is determined based on the sentiment.

4. The computer-implemented method of claim 1, wherein the at least two internal models include a prior knowledge model capable of retrieving prior knowledge information comprising information relating to previous engagement with a user, wherein the selected characteristic is selected based on the prior knowledge information processed using the prior knowledge model.

5. The computer-implemented method of claim 1, further comprising:
    sharing an embedded link to a plurality of users via a network;
    receiving a selection from any of a set of devices indicating that the link has been selected; and responsive to receiving the selection, transmitting the stream of data to the user device of the set of devices that sent the selection to display the virtual character on the user device.

6. The computer-implemented method of claim 1, further comprising:

transmitting a first batch of the stream of data at a first time, the first batch including information to initially generate the virtual character on a display of the user device; and transmitting a second batch of the stream of data at a second time after the first time, the second batch including information to output a first action by the virtual character, wherein the first batch is discarded at the second time.

7. The computer-implemented method of claim 1, further comprising:

inspecting environmental information to identify a portion of the environment representative of a floor of the environment; and positioning the virtual character at a first position above the portion of the environment representative of the floor of the environment.

8. A method for controlling a virtual character, the method comprising:

embedding a link in a web browser of a user device, the link linking the web browser to an application executing on the user device;

receiving an indication from the user device that the link has been selected;

transmitting, from the application to the web browser, a stream of data from the application representing information to the web browser to generate the virtual character;

receiving multi-modal input information from a device, the multi-modal input information including any of speech information, facial expression information, and environmental information representing an environment surrounding the device;

displaying the virtual character in a position in a display environment presented on the device;

implementing at least two internal models to identify characteristics of the multi-modal input information;

inspecting the identified characteristics of the at least two internal models to determine whether a first identified characteristic of the identified characteristics includes a threshold number of similar features of a second identified characteristic of the identified characteristics;

comparing the first identified characteristic and the second identified characteristic against information specific to the virtual character included in a virtual character knowledge model to select a selected characteristic based on determining that the first identified characteristic includes the threshold number of similar features of the second identified characteristic of the identified characteristics;

accessing a library of potential actions associated with the virtual character to determine an action that matches the selected characteristic, the action including both an animation to be performed by the virtual character and associated audio;

implementing the determined action by modifying the virtual character in the environment presented on the device and outputting the associated audio storing information relating to the selected characteristic and the action;

aggregating a series of selected characteristics and actions for a plurality of users;

processing the series of selected characteristics and actions for the plurality of users to derive a set of analytics relating to engagement with the virtual character with the plurality of users; and presenting an analytics dashboard to display the set of analytics relating to engagement with the virtual character with the plurality of users.

9. The method of claim 8, wherein the at least two internal models includes a speech recognition model capable of parsing a speech sentiment from the speech information and a facial feature recognition model capable of detecting a facial feature sentiment based on the facial expression information, wherein the selected characteristic is a sentiment common among the speech sentiment and the facial feature sentiment, and wherein the determined action is determined based on the sentiment.

10. The method of claim 8, wherein the at least two internal models include a prior knowledge model capable of retrieving prior knowledge information comprising information relating to previous engagement with a user, wherein the selected characteristic is selected based on the prior knowledge information processed using the prior knowledge model.

11. The method of claim 8, wherein the internal models include a natural language understanding model configured to derive context and meaning from audio information, an awareness model configured to identify environmental information, and a social simulation model configured to identify data relating to a user and other virtual characters.

12. The method of claim 8, further comprising:

instructing the virtual character to perform an initial action representing a query to a user on the device, wherein the input information represents a response by the user to the query.

13. The method of claim 8, further comprising:

transmitting a first batch of the stream of data at a first time, the first batch including information to initially generate the virtual character on the device; and transmitting a second batch of the stream of data at a second time after the first time, the second batch including information to output a first action by the virtual character, wherein the first batch is discarded at the second time.

14. The method of claim 8, further comprising:

inspecting environmental information to identify a portion of the environment representative of a floor of the environment; and positioning the virtual character at a first position above the portion of the environment representative of the floor of the environment.

15. A device configured to provide a response to a multi-modal input relating to a user captured by the device, the device comprising:

at least one memory including:

at least two internal models configured to identify characteristics from multi- modal input information;

a virtual character knowledge model including information specific to a virtual character; and a library of potential actions associated with the virtual character, each action is associated with an animation to be performed by the virtual character and associated audio; and at least one processor configured to:
  embed a link in a web browser of the device, the link linking the web browser to an application executing on the device;
  receive an indication that the link has been selected;
  transmit, from the application to the web browser, a stream of data from the application representing information to the web browser to generate the virtual character;
  display the virtual character on the web browser of the device;
  receive multi-modal input information including at least one of speech information, facial expression information, and environmental information representing an environment;
  inspect the characteristics identified by the at least two internal models to determine whether a first identified characteristic is within a threshold similarity to a second identified characteristic;
  compare the first identified characteristic and the second identified characteristic against the virtual character knowledge model to identify a selected characteristic;
  determine an action that matches the selected characteristic by inspecting the library of potential actions associated with the virtual character, the action including audio to be outputted on the device;
  output the audio on the device;
  store information relating to the selected characteristic and the action;
  aggregate a series of selected characteristics and actions for a plurality of users;
  process the series of selected characteristics and actions for the plurality of users to derive a set of analytics relating to engagement with the virtual character with the plurality of users; and
  present an analytics dashboard to display the set of analytics relating to engagement with the virtual character with the plurality of users.

16. The device of claim 15, wherein the at least one processor is further configured to:
  display the virtual character on the device in a position in the environment derived from the environmental information; and
  implement the action that includes both the audio to be outputted on the device and a selected animation to be performed by the virtual character by modifying the virtual character in the environment presented on the device.

17. The device of claim 15, wherein the at least two internal models include a prior knowledge model capable of retrieving prior knowledge information comprising information relating to previous engagement with the user, wherein the selected characteristic is selected based on the prior knowledge information processed using the prior knowledge model.

18. The device of claim 15, wherein the at least two internal models includes a speech recognition model capable of parsing a speech sentiment from the speech information and a facial feature recognition model capable of detecting a facial feature sentiment based on the facial expression information, wherein the selected characteristic is a sentiment common among the speech sentiment and the facial feature sentiment, and wherein the determined action is determined based on the sentiment.

* * * * *